United States Patent

[11] 3,608,050

[72] Inventors  Justice N. Carman
               Tarzana;
               Herman G. McKnight, Northridge, both of Calif.
[21] Appl. No. 864,270
[22] Filed      Sept. 12, 1969
[23]            Continuation-in-part of Ser. No. 716,254, Mar. 4, 1968, which is a continuation-in-part of Ser. No. 631,391, Apr. 17, 1967.
[45] Patented   Sept. 21, 1971
[73] Assignee   Union Carbide Corporation

[54] PRODUCTION OF SINGLE CRYSTAL SAPPHIRE BY CAREFULLY CONTROLED COOLING FROM A MELT OF ALUMINA
20 Claims, 5 Drawing Figs.

[52] U.S. Cl. .................................................. 264/332, 23/142, 106/42, 106/65
[51] Int. Cl. ...................................................... C04b 35/10, C04b 35/60
[50] Field of Search .......................................... 264/220, 332; 106/42, 65; 23/142; 148/1.6

[56]              References Cited
                  UNITED STATES PATENTS

| | | | |
|---|---|---|---|
| 1,004,505 | 9/1911 | Verneuil | 106/42 |
| 1,368,958 | 2/1921 | Miller | 65/23 |
| 1,565,777 | 12/1925 | Bertolini | 63/22 |
| 1,583,464 | 5/1926 | Houskeeper | 65/23 |
| 1,615,750 | 1/1927 | Fulcher | 106/55 |
| 1,775,867 | 9/1930 | Sandmeier | 106/42 |
| 1,793,672 | 2/1931 | Bridgman | 148/1.6 |
| 2,149,076 | 2/1939 | Stockbarger | 23/302 |
| 2,214,976 | 9/1940 | Stockbarger | 148/1.6 |
| 2,902,350 | 9/1959 | Jenny et al. | 148/1.6 |
| 3,075,831 | 1/1963 | Remeika | 106/42 |
| 3,079,240 | 2/1963 | Remeika | 106/42 |
| 3,119,778 | 1/1964 | Hamilton | 148/1.6 |
| 3,124,633 | 3/1964 | Van Run | 148/1.6 |
| 3,339,622 | 9/1967 | Horton | 165/36 |

FOREIGN PATENTS

| 1,162,751 | 2/1964 | Germany | 264/30 |
|---|---|---|---|

OTHER REFERENCES

H. C. Kremers, " Synthetic Optical Crystals," an article appearing in the November, 1940 issue of Industrial and Engineering Chemistry at pages 1478– 1482

B. Cockayne et al., " Single-Crystal Growth of Sapphire" an article appearing in the Journal of Materials Science 2 (1967) at pages 7– 11

*Primary Examiner*—Donald J. Arnold
*Assistant Examiner*—John H. Miller
*Attorneys*—Paul A. Rose and Harrie M. Humphreys

ABSTRACT: A charge of alumina is placed in a mold and heated in a vacuum or an inert gas atmosphere to melt the charge. The melt is then cooled in a generally upward direction to solidify and crystallize the melt at a rate that the generally vertical, downward temperature gradient in the crystallizing zone is less than 25°C. per millimeter. After all of the melt has crystallized the single crystal is uniformly cooled and removed from the mold. Special methods of making the mold and removing the mold are also disclosed.

INVENTORS
JUSTICE N. CARMAN
HERMAN G. MCKNIGHT

BY THEIR ATTORNEYS
HARRIS, KIECH, RUSSELL & KERN

INVENTORS
JUSTICE N. CARMAN
HERMAN G. McKNIGHT

BY THEIR ATTORNEYS
HARRIS, KIECH, RUSSELL & KERN

PRODUCTION OF SINGLE CRYSTAL SAPPHIRE BY CAREFULLY CONTROLED COOLING FROM A MELT OF ALUMINA

This invention relates to cast sapphire and to new and improved methods of producing sapphire. Sapphire is a form of alumina, $Al_2O_3$, a composition which may occur in at least four different forms. One form is a colloidal or amorphous powder. A second form results from anodizing metallic aluminum; it is amorphous in structure and builds up with an absence of voids. A third form is a ceramic in which the individual grains are alpha alumina, which in a single crystal is equivalent to sapphire. The ceramic, however, is prepared by firing or sintering alumina powder with or without a small amount of binder. MgO, $SiO_2$, and $Y_2O_3$ are examples of suitable binder materials and typically about 1/2 to 4 percent by weight may be used. The ceramic is polycrystalline with voids which entrap air. The fourth form is referred to herein as the sapphire, which is a solidified or frozen melt of alumina. The sapphire may be a single crystal of alpha alumina preferably with no grain boundaries, but may have low angle grain boundaries with orientations up to 5°. The sapphire may include small amounts of impurities up to about 6 percent by weight. Impurities are added as dopants to produce various colors and to improve physical properties such as hardness, wear resistance and thermal shock capability. Chromium oxide produces a red color making the ruby; the oxides of iron and titanium ($TiO_2$) produce a blue color while $Ti_2O_3$ produces pink; nickel and magnesium produce a golden or topaz color; Titania provides the well-known star rays, resulting from precipitation of the Titania along certain crystallographic planes having the six-fold symmetry of the hexagonal host corundum.

Sapphire has many desirable properties, including its strength and hardness at normal and elevated temperatures, inertness, a high melting point, high thermal conductivity and a broad optical window. Diamond is one of the few materials harder than sapphire. Of course, these properties make sapphire difficult to work.

Sapphire has been produced in the past by such methods as the Verneuil flame fusion process and the Czochralski drawing process. The sapphires produced by these processes are in the form of irregular boules and subsequent machining operations are required to produce a usable article.

It is an object of the present invention to provide a new and improved method of producing sapphire wherein the sapphire is cast in the desired form.

Another object of this invention is to provide a method of producing water white cast single crystal sapphire articles from a substantially pure alumina or sapphire charge.

A further object of this invention is to provide a method of producing single crystal cast sapphire articles having little or no grain boundaries and substantially no thermal tension.

It is another and further object of this invention to provide a method of melting an alumina or sapphire charge at a uniform temperature in a mold, directionally solidifying the molten charge with a minimum temperature gradient, and uniformly cooling the solidified charge to ambient temperature.

It is an object of the invention to provide a method of making a sapphire article including the steps of depositing a shell of material having a relatively high melting point, typically tungsten, onto a pattern which has the form of the desired article, removing the pattern material from the shell, at least partially filling the shell with molten sapphire, and then removing the shell material leaving a cast sapphire article of the desired form. Another object of the invention is to provide the additional step of directionally cooling the sapphire and shell following the pouring step. A further object is to provide various methods of filling the shell, such as pouring molten sapphire into the shell, adding pieces of sapphire during melting, and starting melting with a charge of sapphire pieces in the shell.

Other objects, advantages, features and results will more fully appear in the course of the following description. The drawing merely shows and the description merely describes preferred embodiments of the present invention which are given by way of illustration or example.

Figure 1:
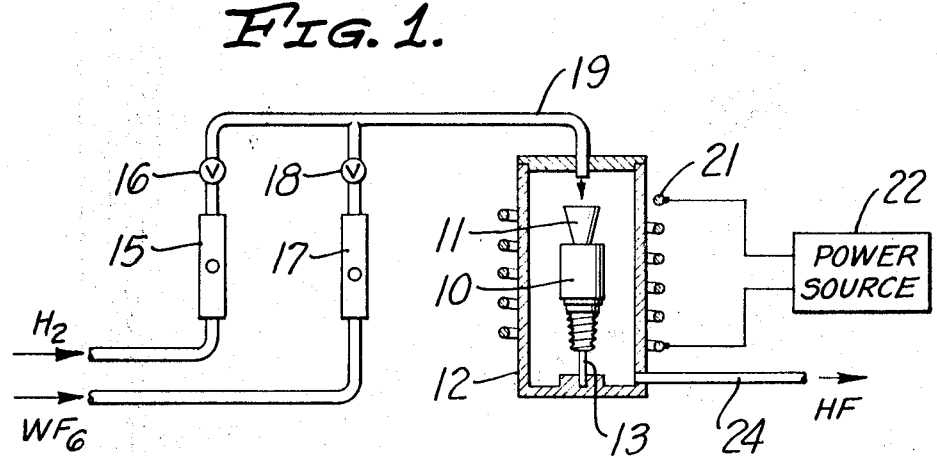
FIG. 1 illustrates a preferred form of apparatus for forming the shell in the process of the invention.

In the process of the invention, a pattern is prepared in the form of the desired article, making the usual dimensional allowances for shrinkage. The pattern may be made by any conventional process and of any suitable material. For example, the pattern may be produced by casting in a mold or die. A shell is deposited on the pattern, the shell being formed of a material which is relatively inert and which has a relatively high melting point. Tungsten is a preferred material for the shell, having a melting point of 3,400° C. and being substantially inert at elevated temperatures as well as at room temperature. Molybdenum with a lower melting point of 2,600° C. may be preferred in some applications. Other shell materials include iridium and rhenium.

The shell of high melting point material is produced by chemical deposition. One suitable process is vapor deposition onto a hot surface from a metal-halide or an organometallic compound. For example, the pattern may be heated to about 600° C. in a hydrogen atmosphere. Tungsten fluoride ($WF_6$) and hydrogen are passed over the heated part, the gases react and metallic tungsten is deposited on the heated pattern, and the released hydrogen fluoride gas is carried out the exhaust. The thickness of the shell is not critical and preferably may be in the order of 1 mm. Small shells may be in the order of ¼ mm. thickness or less.

Another suitable process is electrochemical deposition. For example, the pattern may be used as one electrode in an electroplating tank with the electrolyte comprising a salt bath containing borates and tungstic oxide. The tungsten ions in the fused salt will be deposited as metallic tungsten on the pattern electrode, forming the desired shell.

Iridium and rhenium make excellent shell materials but are very expensive. When it is desired to use one of these metals, the shell may be formed in steps with a first relatively thin inner layer of the more expensive iridium or rhenium and a second thicker outer layer of one of the less expensive metals, such as tungsten or molybdenum. Chemical deposition processes similar to those described in conjunction with tungsten may be utilized with the various mentioned shell materials.

In an alternative method of producing the two-material shell, the shell may be initially made of the first material, after which an inner lining of the second material is applied. For example, a shell of tungsten may be made in the manner described above and then lined with a thin film of iridium or rhenium by electroplating or by a metal powder paint which is fused in place. With the two-layer shell, the inner layer may be in the order of 0.2 mm. thick and the outer layer in the order of 1.0 mm. thick.

It is preferred that the shell material and the pattern material have corresponding coefficients of thermal expansion in order to reduce the possibility of cracking resulting from temperature changes. Some of the iron-nickel-cobalt alloys, such as Kovar produced by Westinghouse, are suitable for the pattern, having a low coefficient of expansion approximating that of tungsten and molybdenum.

Other pattern material may be used, if techniques are employed which avoid the thermal expansion mismatch. By way of example, high thermal expansion materials such as stainless steel, copper and copper alloys, aluminum and aluminum alloys may be used as the pattern material. The pattern is heated to shell deposition temperature prior to exposure to the gas stream. The pattern does not expand further during the shell deposition and does not stress the shell. In cooling down from deposition temperature, the pattern shrinks away from the deposited shell. Pattern configurations having proper draft angles can frequently be removed and reused.

The pattern is now removed from the shell, which may be accomplished by immersing the shell in a suitable solvent to dissolve the pattern material, or by heating to a temperature above the melting point of the pattern material and below the melting point of the shell material. For example, the Kovar pattern may be removed from a tungsten shell by dissolving the Kovar in hydrochloric acid or an aluminum pattern may be removed by melting at 660° C.

The empty shell now serves as a mold and is filled or partially filled with molten sapphire. In one filling process the shell is heated to a temperature above the melting point of sapphire and a piece or pieces of sapphire are dropped into the mold. The mold may contain a small amount of solid sapphire prior to heating, and additional pieces of sapphire may be added and melted until the mold is filled to the desired level. Alternatively, the mold may be filled with pieces of sapphire prior to heating, but this requires a large sprue in the pattern and shell. Scrap sapphire pieces from any of several sources may be used. One such material is the broken pieces of Verneuil material sometimes referred to as "craquele." In another alternative process for filling the mold, molten sapphire may be poured into the mold.

In the last mentioned alternative filling process, alumina powder is heated in a crucible to produce the sapphire melt. For optical parts, a high purity powder is desired.

In one of the preferred embodiments of the present invention the mold is charged with alumina or sapphire at ambient temperature and the charged mold is heated to produce the sapphire melt. For mechanical parts, a small amount of other materials may be added. For example, up to 6 percent of $Cr_2O_3$ may be added to improve the tensile strength of the cast sapphire. The cast sapphire when slowly cooled from the bottom up is a single crystal, which may gave some low angle grain boundaries or disoriented regions up to 5°. Where the presence of the additional material is not deleterious, up to 6 percent of various materials may be added to give certain colors and/or properties to the sapphire.

When the mold is filled, either with nonmolten alumina or sapphire, or molten sapphire, the mold and its charge are heated to a temperature above the melting point of sapphire. In the preferred embodiment of the present invention, this heating step is conducted either in a vacuum of one torr or less, preferably less than $10^{14}$ torrs, or under an inert gas, preferably helium or argon. Once the mold and its melt have reached a uniform temperature, the mold and its molten charge are directionally cooled. However, when the heating step is conducted in a vacuum, the heating step preferably is continued until the molten charge has both degassed and reached a uniform temperature.

In the cooling step it is preferred to control the cooling and to have the cooling occur directionally, usually from the bottom of the mold to the top. This eliminates stresses and entrapments which might occur from shrinkage of the sapphire during cooling and also promotes a single crystal form. When a single crystal product is desired, the pattern should be provided with a nucleation point at the lower portion thereof. A small piece of sapphire may be placed in the bottom of the mold to serve as a seed crystal for growing a single crystal piece. In order for the small piece of sapphire to function as a seed crystal it is imperative that a part of the seed crystal preserve its physical integrity during the heating step. Equally as important, we have found that a portion of the seed crystal must be melted and become an integral part of the molten charge in order for the sapphire seed to serve most effectively as a seed crystal. In one modification of the present invention, a heat sink is attached to the bottom of the mold to remove heat therefrom in order to prevent the entire sapphire seed from melting during the heating step.

As stated above, once the mold is filled with a molten charge of sapphire, the mold and charge are directionally cooled. The cooling is conducted upwardly from the bottom or lower edge to the top or upper edge along the mold. The directional cooling can be accomplished by lowering the charged mold from a first heating or melting zone wherein the temperature is above the melting point of sapphire to a crystallizing or annealing zone where the temperature is below the melting point of sapphire. Alternatively, the charged mold can remain stationary and the lower portion of the melting zone can be cooled directionally upwardly to a temperature less than the melting point of sapphire by disposing upwardly a heat shield or sink between the mold and the heat source. Regardless how the directional cooling is effected, the cooling must be at such a rate that the generally vertical downward temperature gradient of the charge is less than −25° C. per millimeter. If the cooling rate is such that the downward temperature gradient exceeds −25° C. per millimeter, the quality of the sapphire crystal articles suffers, for example, the cast sapphire crystal articles are smoky in color rather than water white, they are thermally stressed, they have large angle grain boundaries and/or they have plane cleavages. There is no lower limit to the temperature gradient that can be employed; however, with downward temperature gradients of less than −0.1° C. per millimeter the cooling rates are generally so slow as not to be practical or commercially feasible. In the preferred embodiment of the invention, the directional cooling rate is such that the generally vertical downward temperature gradient of the charge is between −1° C. and −10° C. per millimeter.

In a preferred embodiment of the present invention, after the melting step, the molten sapphire is directionally solidified in an upward direction from the lower edge to the upper edge along the mold in a second heating or transition zone which has a maximum temperature no greater than the temperature of the first heating or melting zone, a minimum temperature of less than 2,030° C., generally between about 1,500° C. and about 2,000° C., preferably about 1,800° C., and a generally vertical, downward temperature gradient of less than −25° C. per millimeter, preferably about −1.0° C. to about −10° C. per millimeter; the solidified sapphire in the mold, is further directionally cooled in an upward direction from the lower edge to the upper edge along the mold in a third heating or annealing zone having a uniform temperature no greater than the minimum temperature of the second heating zone, generally between about 1,500° C. and about 2,000° C., preferably about 1,800° C. The mold and contents are then cooled to a temperature suitable for handling, typically room temperature. The sapphire changes from the plastic or semiplastic to the elastic state as it cools below about 900° C. In this casting method, the cast sapphire article is a single crystal with little or no grain boundaries, little, if any thermal tension, and no plane cleavages. While no disorientation is preferred, a cast article may have low angle grain boundaries with orientations up to 5° and still be considered a single crystal article.

The growth rate, i.e., the rate at which the mold is moved relative to the heating zones, is dependent to some degree upon the volume of material involved. The growth rate will normally be in the range of 1 to 10 mm. per hour. Growth rates of less than 1 mm. per hour are usually to slow to be economical but may be used for special laboratory purposes. A product of smaller lateral size or diameter may be produced with higher temperature gradients and higher growth rates. A piece of cast sapphire with a diameter of ¾ to 1 inch may be produced using temperature gradients up to −25° C. per mm. and growth rates up to 10 mm. per hour. A piece of cast sapphire with a diameter of 2½ inches to 3 inches preferably is produced with a temperature gradient of about −5° C. per mm. and a growth rate of about 3 mm./hour.

After the sapphire is cooled, the shell is removed leaving the cast sapphire in the form of the initial pattern. The shell may be removed electrolytically utilizing a strong base solution as the electrolyte. In an alternative step, the shell may be removed the the reverse of the vapor deposition operation. For example a tungsten shell with the cast sapphire therein may be heated to about 600° C. and exposed to a stream of a halide gas, such as chlorine gas. The tunsgten reacts with the chlorine forming gaseous tungsten chloride.

When molds are used that (1) have inner straight parallel sides or diverging sides, such as molds of cylindrical shapes, square rode, upside-down pyramidal shapes, upside-down conical sections, shapes of hyperbolas of revolution, and the like, and (2) are made of metals having lower coefficients of expansion than sapphire, such as tungsten and molybdenum, the cast sapphire crystal article upon cooling will generally slip or slide out of the mold upon inverting the mold because the sapphire casting shrinks away from the mold upon cooling.

Figure 3:
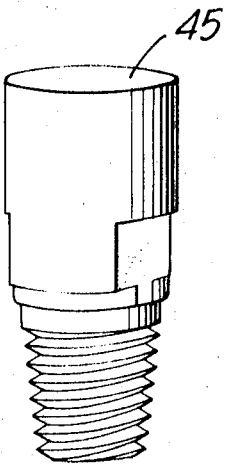
FIG. 3 is an isometric view of a typical article prepared according to the invention.

A variety of articles may be produced by the process of the invention and typical articles include turbine blades, phonograph needles, bearings, thread guides, infrared domes, lenses of various shapes, and guide screws. The drawing illustrates steps in a process of producing a sapphire guide screw as shown in FIG. 3.

In FIG. 1, a pattern 10 in the form of the desired article, with an addition 11 to form a sprue, is supported within a chamber 12 on a tungsten pin 13. A stream of hydrogen gas passes through a flowmeter 15 and a control valve 16 and mixes with a stream of tungsten fluoride gas passing through a flowmeter 17 and a control valve 18. The gases are mixed in a line 19 and are directed into the chamber 12 and on to the heated pattern 10. The pattern should be heated to about 600° C. and any of the conventional heating arrangements may be employed. An induction coil 21 energized from a power source 22 is illustrated in FIG. 1. Heat can also be supplied by self-resistive heating of the pattern by a cartridge heater disposed within the pattern, and by radiant furnace heating. Metallic tungsten is deposited on the heated pattern and the resultant hydrogen fluoride gas flows out through line 24.

After the shell has built up to the desired thickness, the pattern is removed from the shell, leaving the shell ready for casting.

Figure 2:
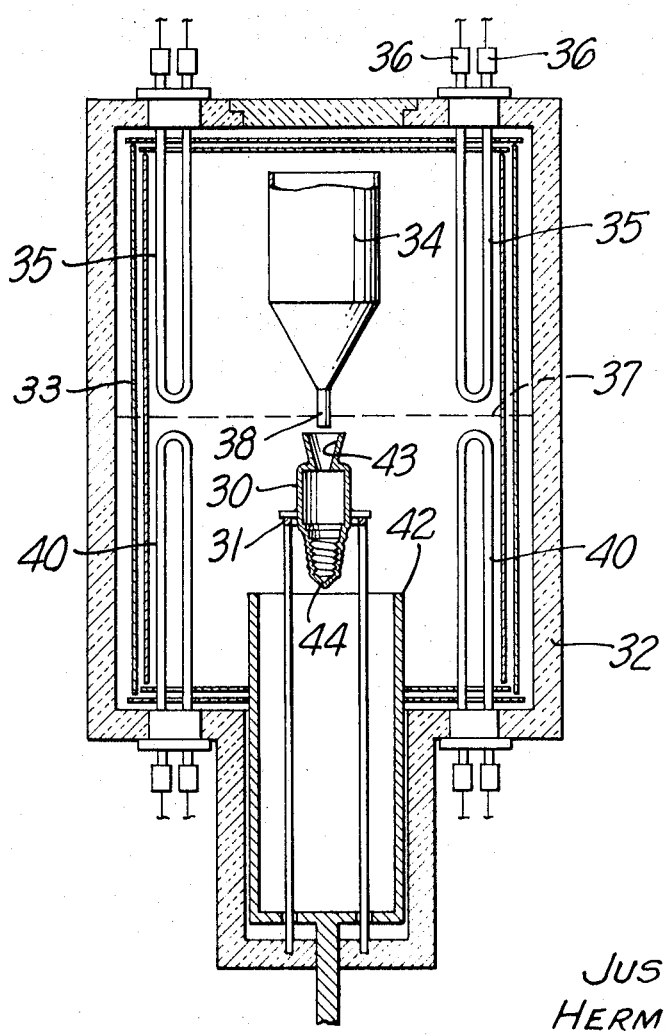
FIG. 2 illustrates one form of apparatus for casting the article.

FIG. 2 illustrates one embodiment of the casting operation, with the shell 30 supported with pins on an appropriate stand 31 within a chamber 32. A number of heat shield plates 33 may be disposed adjacent the interior walls of the chamber 32. The raw material is placed in a crucible 34, typically of tungsten with the interior lined with iridium. The crucible 34 and contents are heated to about 2,100° C. until the powder has formed a molten mass. Heating may be performed by various mechanisms, such as a plurality of resistive heaters 35 disposed within the chamber 32 about the crucible 34. The resistive heaters 35 terminate in copper contact blocks 36 for connection to a suitable power source. The contact blocks preferably are water-cooled. The heating and casting are preferably performed in a nonoxidizing atmosphere within the chamber 32.

The heaters 35 provide heating in an upper zone of the chamber 32 above the dashed line 37. The crucible 34 terminates in a drain tube 38 which projects below the line 37 out of the upper heating zone. The lower end of the drain tube 38 is plugged to retain the molten sapphire within the crucible.

After the material in the crucible is completely melted, the temperature in a lower zone below the line 37 is raised to about 2,100° C. This may be accomplished by a second set of resistive heaters 40. The increase in temperature in the lower zone melts the plug in the drain tube 38, permitting the molten sapphire to pour into the mold 30. The heat may then be shut off in the upper zone.

The heat may also be shut off in the lower zone but it is preferred to directionally cool the mold and casting to reduce stresses due to cooling and to enhance single crystal growth. Directional cooling may be accomplished by maintaining the heaters 40 energized while moving a tubular shield 42 between the mold 30 and the heaters 40, the shield 42 acting as a heat sink.

In the apparatus illustrated in FIG. 2, the heat shield 42 raised slowly from a position below the mold 30 to a position completely surrounding the pattern, after which the heaters may be deenergized. The melting zone is above the upper edge of the shield 42, the annealing zone is below the upper edge thereof, and the transition zone is in the region of the upper edge of the shield 42.

The resistive heaters typically are made of tungsten and the heat shield 42 typically is made of molybdenum. There will be the usual shrinkage of the material down the sprue 43 as the sapphire cools. When a single crystal structure is desired, a nucleation point 44 may be provided at the lower end of the mold. At the end of the pouring operation, a small amount of the sapphire may solidify in the drain tube 38, providing the plug for the next casting operation.

In the preferred embodiment of the present invention, the chamber 32 is of vacuum and/or gastight construction having an exhaust duct (not illustrated) leading to a vacuum pump assembly, or, alternatively, has an inlet duct (not illustrated) leading from an inert gas reservoir and an outlet duct (not illustrated) leading to an exhaust via a valve. The casting operation is conducted either in a vacuum or in an inert gas atmosphere, preferably under a vacuum. When casting in a vacuum, a vacuum of less than one torr is employed, preferably less than $10^{14}$ torrs.

Figure 4:
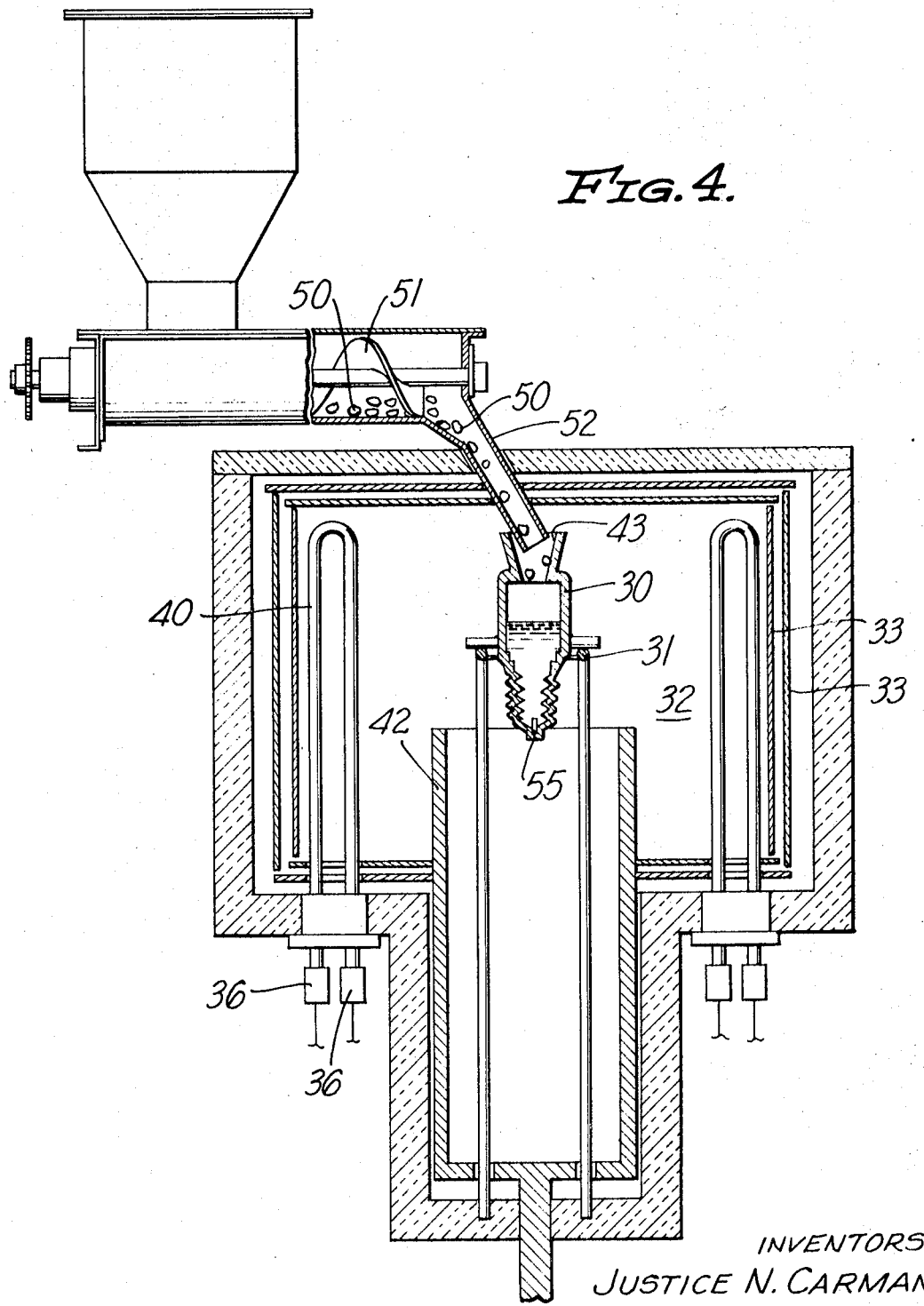
FIG. 4 illustrates another form of apparatus for casting the article.

FIG. 4 illustrates an alternative embodiment of the casting operation, with elements corresponding to those of FIG. 2 identified by the same reference numerals. In the embodiment of FIG. 4, pieces 50 of solid sapphire are dropped into the mold 30, as by means of an auger conveyor 51 and feed tube 52. In the preferred mode of operation, a few pieces of solid sapphire are placed in the bottom of the mold 30 and the mold is heated to a temperature above the melting point of the sapphire. After the initial pieces are melted, additional pieces are added and melted, with the addition of pieces and melting continuing until the mold is filled to the desired level with molten sapphire. In another alternative mode of operation, the shell 30 may be heated while empty and the pieces of sapphire added after the shell is above the melting point of sapphire. In another alternative mode, the shell may be filled with pieces of sapphire prior to heating, with the sapphire feed apparatus 51, 52 omitted. This method ordinarily is not preferred since the sapphire pieces occupy considerably more space than the molten sapphire. Thus, the sprue 43 of the mold and all of the associated equipment would need to be considerably larger when all the sapphire pieces are inside the mold to start with than if the major portion of the pieces are added after the mold reaches the melting temperature.

A small piece 55 of sapphire may be positioned in the bottom of the mold to serve as a seed crystal for growing a single crystal piece as the molten sapphire is cooled. A typical seed crystal may be in the order of ⅛ inches in diameter and ⅜ inches long. The temperature within the chamber 32 may be controlled so that all the sapphire pieces within the mold 30 melt except a portion of the seed crystal 55. This may be accomplished by maintaining the upper edge of the shield 42 slightly above the lower end of the mold 30, as illustrated in FIG. 4, or by careful positioning of the mold with respect to the heaters in the furnace, or by using a seed of considerable length. The molten mass of sapphire may be cooled in the same manner as described in conjunction with FIG. 2 above.

After the mold and casting are cooled, the mold material is removed. The cast material in the sprue is also removed, leaving the article as illustrated in FIG. 3. This particular article is a wear or guide screw providing a wear surface 45, with the device being installed by screwing into a threaded opening. It will readily be seen that cast sapphire can be produced in many other forms as desired for the ultimate end of use of the cast sapphire.

Figure 5:
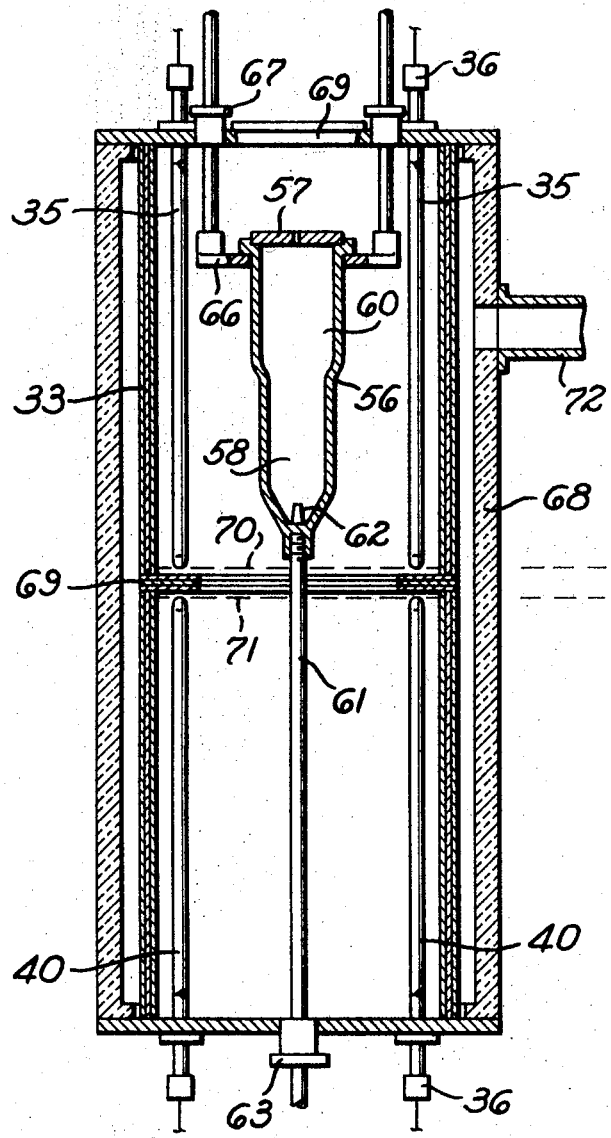
FIG. 5 illustrates another and preferred form of apparatus for casting the article.

FIG. 5 illustrates another alternative and presently preferred embodiment of the casting operation with elements corresponding to those of FIG. 2 identified by the same reference numerals. In the embodiment of FIG. 5, a mold 56 preferably with an apertured cover 57, is movably disposed in a furnace 68. Furnace 68 is of a vacuum-tight or gastight construction and has the plurality of first resistive heaters 35 and a plurality of second resistive heaters 40. The heat shields 33 may include a horizontally disposed section 69 disposed between the ends of the heaters 35, 40. The furnace 68 has an upper first heating or melting zone, a lower third heating or annealing zone, and an intermediate second heating or transition zone. The melting zone is above the line 70 and the annealing zone is below the line 71.

Figure 6:
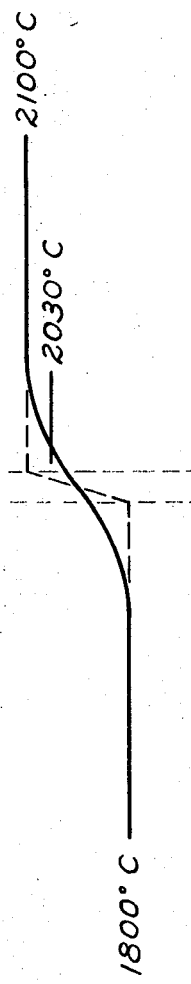
FIG. 6 is a diagram illustrating the temperature in the apparatus of FIG. 5.

When the furnace is in operation, the first heating zone is heated to a temperature in excess of 2,030° C., preferably about 2,100° C., and the third heating zone is heated to a temperature of less than 2,030° C., preferably about 1,800° C. The second heating or transition zone does not have a uniform temperature, but rather it has a generally vertical, downward temperature gradient. The average temperature of the transition zone is between the temperatures of the upper heating zone and lower heating zone. The temperature in the zones is illustrated in FIG. 6 and it is seen that the transition zone is wider than the space between the ends of the heaters 35, 40, i.e., the temperature does not have the sharp change of the dashed line, but rather the gradual change of the solid line. In a typical piece of apparatus, the gap between the heaters, i.e., between lines 70, 71, may be in the order of ¼ inch to ½ inch while the transition zone is in the order of 3 inch to 6 inch high.

The furnace of FIG. 5 has an exhaust duct 72 which leads to a vacuum pump assembly that is of sufficient capacity or size to maintain a vacuum of at least one torr, preferably at least $10^{14}$ torrs, when the furnace is in operation. Alternatively, in a modified version of furnace 68, which is not illustrated, furnace 68 can have an inert gas inlet duct leading from an inert gas supply, an outlet duct leading to an exhaust stack via an outlet valve.

In the casting operation, substantially all heat transfer within the furnace takes place via radiation rather than by convection or conduction. In such cases, the temperature in the upper heating zone is fairly uniform and the temperature in the lower heating zone is fairly uniform; only the second heating zone has a temperature gradient. In the preferred embodiment of the invention, the temperature differences between the upper and lower heating zones and the width of the intermediate heating zone are such that the generally vertical downward temperature gradient of the intermediate zone during the casting operation is less than −25° C. per millimeter, preferably between −1° C. and −10° C. per millimeter.

The furnace 68 is fitted with a movable mold support 66 which extends through the upper wall of the furnace via vacuum and/or gastight fittings 67. The mold 56 is supported inside the furnace by the movable mold support 66. Outside the furnace 68, the movable mold support 66 is attached to movable support means for supporting and moving the movable support 66 and the mold 56 supported thereon. The movable support means can be any conventional device which can support and move the movable mold support 66, the mold 56 and its charge upwardly or downwardly. For example, the movable support means can be a combination of an electric motor driven gear and rack engaging said gear, the rack being attached to the movable mold support.

Secured to the bottom of the mold 56 is a heat sink 61 which extends through the bottom wall of the furnace 68 through a vacuumtight and/or gastight fitting 63. The heat sink 61 is cooled by immersing the bottom portion of the heat sink 61 outside the furnace 68 in a cool air, bath, water bath, oil bath (not illustrated) or the like. Alternatively, the heat sink 61 can be cooled by fitting it with two longitudinal passages that are contiguous at the upper end of the heat sink 61 and passing a coolant, such as a cool gas or liquid, through the longitudinal passages.

In order to minimize forces or stresses on the mold 56, the heat sink 61 is preferably supported outside the furnace 68 by movable holding means for supporting and moving the heat sink and the mold 56 secured thereto. The movable holding means can be similar to the movable support means and in the preferred embodiment of the present invention they are connected to one another in order to provide uniform movement of the mold.

The casting operation is conducted by charging the mold 56 with a alumina or sapphire charge. The mold 56 can be charged in the furnace 68 via a suitable vacuum and/or gastight entry way 69, or it can be charged outside the furnace 68. After the mold 56 is charged, the furnace is evacuated by the operation of the vacuum pump assembly, and the first and second sets of resistive heaters 35 and 40 are energized to bring the upper heating zone and the lower heating zone up to their operating temperatures.

After the furnace has been brought up to operating temperature and the charge has melted to form molten sapphire, the mold 56 is moved downward on the movable mold support 66 and heat sink 61 into the intermediate heating or transition zone to solidify the molten sapphire at such a rate that the longitudinal or generally vertical, downward temperature gradient of the sapphire is less than −25° C. per millimeter, preferably between −1° C. and −10° C. per millimeter. The minimum temperature in the transition zone is less than 2,030° C. In the preferred embodiment of the invention, the generally vertical, downward temperature gradient of the transition zone is less than −25° C. per millimeter.

The downward movement of the mold 56 is continued into the lower heating or annealing zone where the solidified sapphire or cast sapphire crystal article is further cooled. The temperature of the lower zone is below 2,030° C., preferably about 1,800° C. In most operations the mold is longer than the height of the transition zone; thus, at some point in the casting operation, the mold will transverse the transition zone and have its lower portion in the annealing zone and its upper portion in the melting zone. When the mold 56, or at least that portion containing sapphire, has moved into the third or annealing zone, the downward movement may be terminated and the first and second resistive heaters 35 and 40 may be deenergized to allow the mold 56 and the cast sapphire crystal article to cool uniformly to ambient temperature. The cast sapphire crystal article is removed from the mold 56 as described herein before.

In a preferred embodiment of the present invention prior to charging mold 56 with alumina or sapphire charge, a sapphire seed 62 is inserted into the bottom of the mold to serve as a crystallization seed. In the heating step of the above casting operation, part of the seed 62 will be melted by the molten charge; however, the bottom portion of the sapphire seed 62 which is located at the bottom of the mold 56 and proximate to the top portion of the heat sink 61 will not be melted because the heat sink will remove sufficient heat from this area of the mold 56 by conduction to maintain the temperature of the bottom portion of the seed 62 below the melting point of sapphire.

In tee embodiment of the mold 56 illustrated in FIG. 5, the mold has a lower mold section 58 and an upper charge storage section 60. In this embodiment, the mold 56 can be charged with large particles of alumina or sapphire in the upper charge storage section 60. Little, if any, of the charge will fall into the lower mold section 58. When the mold and the charge are heated at a temperature of more than 2,030° C., the charge will begin to melt and flow into the lower mold section of the mold 58. This is a particularly useful embodiment of a mold 56 when the dimes of the charge particles are large compared with the minor dimensions of the article to the cast.

Although exemplary embodiments of the invention have been disclosed and discussed, it will be understood that other applications of the invention are possible and that the embodiments disclosed may be subjected to various changes, modifications and substitutions without necessarily departing from the spirit of the invention. As is seen from the various embodiments described herein, the heat charge is used broadly to include; pouring molten alumina into the heated mold; partially filling the mold with pieces of alumina or sapphire which are melted in place with additional pieces added after the initial melting; and initially placing the entire quantity of solid material in the mold and melting it therein.

We claim:

1. A method of making a single crystal sapphire article, including the steps of:

charging a hollow mold of metal selected from the group consisting of tungsten, molybdenum, iridium and rhenium with alumina or sapphire;

heating the mold and the charge therein to a first temperature above 2,030° C.; Serial No. 864,270 . . . . . . . . . . . . . . .
. . . . 2.

directionally crystallizing the molten sapphire by cooling the mold and the molten sapphire therein in a generally upward direction from the lower end to the upper end along the mold to a second temperature below 2,030° C. at such a rate that the generally vertical, downward temperature gradient of the sapphire in the transition zone between said first and second temperatures is less than −25° C. per millimeter;

uniformly cooling the crystallized sapphire to ambient temperature and removing the mold to leave a cast sapphire crystal article of desired form wherein the heating and the directional crystallizing steps are conducted in a vacuum or an inert gas atmosphere.

2. The method of claim 1 wherein said heating step and said directional crystallizing step are conducted in a vacuum of less than one torr.

3. The method of claim 1 wherein said heating step and said directional crystallizing step are conducted in an inert gas selected from the group consisting of helium and argon.

4. The method of claim 1 wherein said directional crystallizing step include cooling said mold and said molten sapphire therein at such a rate that the generally vertical, downward temperature gradient of said sapphire in said transition zone is between −1° C. and −10° C. per millimeter.

5. The method of claim 1 wherein said directional crystallizing step includes cooling at a rate between 1 and 10 mm. per hour along the generally vertical axis of said mold and molten sapphire 6. The method of claim 1 wherein said charging step includes at least partially filling said mold with molten sapphire while maintaining said mold at a temperature of at least 2,030° C.

7. The method of claim 1 including the step of preparing said mold by depositing said metal on a pattern of the desired form by electro deposition.

8. The method of claim 1 including the step of preparing said mold by depositing said metal on a pattern of desired form by vapor deposition.

9. The method of claim 1 including the step of preparing said mold by forming said mold with a thin inner layer of one of said metals and a thicker outer layer of another of said metals.

10. The method of claim 1 wherein the charging step comprises: heating said mold, melting a quantity of alumina or sapphire to form molten sapphire, and pouring said molten sapphire into said mold heated to a temperature of at least 2,030° C.

11. The method of claim 1 wherein said charging step includes placing pieces of solid alumina or sapphire in said mold.

12. The method of claim 1 wherein said heating step includes heating said mold and said charge therein by directing radiant heat laterally thereon; and wherein said directional crystallizing step includes cooling said mold and said molten sapphire in a generally upward direction by moving a heat shield upwardly adjacent said mold to progressively block said radiant heat.

13. The method of claim 1 wherein said heating step includes heating said mold and said charge therein in a first heating zone to a substantially uniform temperature of at least 2,030° C.; and wherein said directional crystallizing step includes cooling said mold and said sapphire in a generally upward direction by lowering the mold into a second heating zone where the temperature is less than 2,030° C.

14. The method according to claim 1 wherein a sapphire seed crystal is placed in the bottom inside of said mold to act as a nucleus for crystal growth in said directional cooling step, and including maintaining the bottom of said mold and the bottom portion of said sapphire seed crystal during said heating step at a lower temperature than the remainder of said mold and said crystal so as to prevent the bottom portion of said sapphire seed crystal from melting.

15. A method of casting a sapphire crystal article having substantially no thermal tension which includes the steps of:

heating an alumina or sapphire charge in a mold made of a metal from the group consisting of tungsten, molybdenum, iridium and rhenium in a first heating zone having a substantially uniform temperature of at least 2,030° C. to form a sapphire melt;

directionally solidifying the sapphire melt in the mold in an upward direction from the bottom end to the top end along the mold by moving the mold into a second heating zone having a minimum temperature of less than 2,030° C. at such a rate that the generally vertical, downward temperature gradient of the sapphire in a transition zone between said first and said second heating zones is less than −25° C. per millimeter;

directionally cooling the cast solidified sapphire, in the mold in an upward direction from the bottom end to the top end along the mold by moving the mold into a third heating zone having a substantially uniform temperature which is below 2,030° c. wherein the heating and the directional solidifying steps are conducted in a vacuum or an inert gas atmosphere.

16. The method of claim 15 wherein the second heating zone has a generally vertical, downward temperature gradient of less than −25° C. per millimeter 17. The method of claim 15 wherein said second heating zone has a minimum temperature between about 2,000° C. and about 1,500° C.

18. The method of claim 15 wherein said second heating zone has a minimum temperature of about 1,800° C.

19. The method of claim 15 wherein said heating step, said directional solidifying step, and said directional cooling step are conducted in a vacuum of less than one torr.

20. The method of claim 15 wherein said heating step, said directional solidifying step, and said directional cooling step are conducted in an inert gas selected from the group consisting of helium and argon.

PO-1050
(5/69)

UNITED STATES PATENT OFFICE
CERTIFICATE OF CORRECTION

Patent No. 3,608,050  Dated September 21, 1971

Inventor(s) J. N. Carman and H. G. McKnight

It is certified that error appears in the above-identified patent and that said Letters Patent are hereby corrected as shown below:

Column 9, lines 14-15, delete -- Serial No. 864,270.....2. --

Column 9, line 26, after "form" insert a -- semi-colon --.

Column 9, line 36, change "includd" to -- includes --.

Column 10, line 45, change "c." to -- C; --.

Signed and sealed this 4th day of April 1972.

(SEAL)
Attest:

EDWARD M. FLETCHER, JR.
Attesting Officer

ROBERT GOTTSCHALK
Commissioner of Patents